(12) United States Patent
Kim

(10) Patent No.: US 10,527,019 B2
(45) Date of Patent: Jan. 7, 2020

(54) METHOD FOR STARTING ENGINE FOR HYBRID ELECTRIC VEHICLE

(71) Applicants: Hyundai Motor Company, Seoul (KR); Kia Motors Corporation, Seoul (KR)

(72) Inventor: Jong Hyuck Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 105 days.

(21) Appl. No.: 15/814,185

(22) Filed: Nov. 15, 2017

(65) Prior Publication Data

US 2018/0340503 A1 Nov. 29, 2018

(30) Foreign Application Priority Data

May 25, 2017 (KR) .......................... 10-2017-0064860

(51) Int. Cl.
*F02N 11/08* (2006.01)
*B60W 20/00* (2016.01)
*F02N 11/04* (2006.01)

(52) U.S. Cl.
CPC ......... *F02N 11/0829* (2013.01); *B60W 20/00* (2013.01); *F02N 11/0837* (2013.01); *F02N 11/0866* (2013.01); *F02N 11/04* (2013.01); *F02N 2200/022* (2013.01); *F02N 2300/2002* (2013.01)

(58) Field of Classification Search
CPC ............. F02N 11/0814; F02N 11/0855; F02N 11/0844; F02N 11/006; F02N 11/04; F02N 11/0829; F02N 11/0866
See application file for complete search history.

(56) References Cited

U.S. PATENT DOCUMENTS

| 7,165,523 B1 | 1/2007 | Richard |
| 9,243,599 B2 | 1/2016 | Kitano et al. |
| 2002/0179348 A1* | 12/2002 | Tamai ................... B60W 20/13 180/65.25 |

(Continued)

FOREIGN PATENT DOCUMENTS

| JP | 2003-506627 A | 2/2003 |
| JP | 2007-246030 A | 9/2007 |

(Continued)

*Primary Examiner* — George C Jin
(74) *Attorney, Agent, or Firm* — Morgan, Lewis & Bockius LLP

(57) ABSTRACT

A method for starting an engine for a hybrid electric vehicle that includes a starter connected to the engine by a gear to start the engine and a motor-generator connected to the engine by a belt to start the engine or produce electricity include determining whether a start signal is input, determining whether a predetermined cold start condition is satisfied when it is determined that the start signal is input, starting the engine by use of the starter in a predetermined cold start mode when the cold start condition is satisfied, determining whether a predetermined cooperative control start condition is satisfied when the cold start condition is not satisfied, and starting the engine by use of the starter and the motor-generator in a predetermined cooperative control start mode when the cooperative control start condition is satisfied.

15 Claims, 7 Drawing Sheets

(56) References Cited

U.S. PATENT DOCUMENTS

| | | | | |
|---|---|---|---|---|
| 2004/0011316 A1* | 1/2004 | Tumback | ............... | B60K 6/48 |
| | | | | 123/179.28 |
| 2004/0099234 A1* | 5/2004 | Tamai | ................... | B60K 6/485 |
| | | | | 123/179.3 |
| 2006/0016412 A1* | 1/2006 | Butcher | ................ | B60K 6/365 |
| | | | | 123/179.3 |
| 2007/0113814 A1* | 5/2007 | Tamai | ................... | B60L 58/20 |
| | | | | 123/179.3 |
| 2012/0199090 A1 | 8/2012 | Kitano et al. | | |
| 2013/0066492 A1* | 3/2013 | Holmes | ................ | B60W 20/00 |
| | | | | 701/22 |
| 2013/0082263 A1 | 4/2013 | Honda et al. | | |
| 2014/0296025 A1* | 10/2014 | Fushiki | ............... | B60W 10/04 |
| | | | | 477/3 |
| 2015/0226171 A1* | 8/2015 | Kees | .................... | B60K 6/485 |
| | | | | 290/31 |
| 2016/0056299 A1 | 2/2016 | Honda et al. | | |

FOREIGN PATENT DOCUMENTS

| | | |
|---|---|---|
| JP | 2011-094488 A | 5/2011 |
| JP | 2013-084946 A | 5/2013 |
| JP | 2013-107539 A | 6/2013 |

\* cited by examiner

METHOD FOR STARTING ENGINE FOR HYBRID ELECTRIC VEHICLE

CROSS-REFERENCE TO RELATED APPLICATION

The present application claims priority to Korean Patent Application No. 10-2017-0064860, filed on May 25, 2017, the entire contents of which is incorporated herein for all purposes by this reference.

BACKGROUND OF THE INVENTION

Field of the Invention

The present invention relates to a method for starting an engine for a hybrid electric vehicle.

Description of Related Art

Hybrid electric vehicles are vehicles designed to enhance fuel efficiency by use of an engine and an electric motor as power sources. Hybrid electric vehicles include an engine, a starter capable of starting the engine, a motor-generator capable of starting the engine or producing electricity, a low-voltage battery for driving the starter, a high-voltage battery for driving the motor-generator, and the like.

In general, an engine has various engine start modes to start appropriately depending on driving conditions. However, in the case of a hybrid electric vehicle, an engine may be selectively started by a starter and a motor-generator that differ from each other in an initial torque value, a driving voltage, how to connect with the engine, and the like. Accordingly, for a hybrid electric vehicle, it is necessary to find a way to use a starter and a motor-generator depending on driving conditions to effectively implement various engine start modes.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for starting an engine for a hybrid electric vehicle that is configured for effectively implementing various engine start modes by use of a starter and a motor-generator.

The technical problems to be solved by the present invention are not limited to the aforementioned problems, and any other technical problems not mentioned herein will be clearly understood from the following description by those skilled in the art to which the present invention pertains.

According to various aspects of the present invention, a method for starting an engine for a hybrid electric vehicle, which may include a starter connected to the engine by a gear to start the engine and a motor-generator connected to the engine by a belt to start the engine or produce electricity, may include determining whether a start signal is input, determining whether a predetermined cold start condition is satisfied when it is determined that the start signal is input, starting the engine by use of the starter in a predetermined cold start mode when the cold start condition is satisfied, determining whether a predetermined cooperative control start condition is satisfied when the cold start condition is not satisfied, and starting the engine by use of the starter and the motor-generator in a predetermined cooperative control start mode when the cooperative control start condition is satisfied.

According to an exemplary embodiment of the present invention, the cold start condition may be satisfied when engine stall time exceeds predetermined reference stall time and/or when a current of a battery configured to supply power to the starter is lower than a predetermined reference current.

According to an exemplary embodiment of the present invention, the determining of whether the predetermined cold start condition is satisfied may include determining whether the engine stall time is less than or equal to the reference stall time and determining whether the current of the battery is higher than or equal to the reference current.

According to an exemplary embodiment of the present invention, the starting of the engine by use of the starter may include beginning a start-up process of the engine by use of the starter, determining whether an engine RPM exceeds a predetermined first reference RPM, and stopping the start-up process of the engine using the starter when the engine RPM exceeds the first reference RPM.

According to an exemplary embodiment of the present invention, the beginning of the start-up process of the engine may be performed by engaging a pinion gear of the starter and a ring gear of the engine together, and the stopping of the start-up process of the engine may be performed by disengaging the pinion gear of the starter and the ring gear of the engine.

According to an exemplary embodiment of the present invention, the first reference RPM may be 200 RPM.

According to an exemplary embodiment of the present invention, the cooperative control start condition may be satisfied when a voltage of a battery configured to supply power to the starter exceeds a predetermined reference voltage and an engine RPM is equal to zero at the same time.

According to an exemplary embodiment of the present invention, the determining of whether the predetermined cooperative control start condition is satisfied may include determining whether the voltage of the battery exceeds the reference voltage and determining whether the engine RPM is equal to zero.

According to an exemplary embodiment of the present invention, the starting of the engine by use of the starter and the motor-generator may include beginning a start-up process of the engine by use of the starter, determining whether the engine RPM exceeds a predetermined second reference RPM, and continuing the start-up process of the engine by use of the motor-generator when the engine RPM exceeds the second reference RPM.

According to an exemplary embodiment of the present invention, the starting of the engine by use of the starter and the motor-generator may further include stopping the start-up process of the engine using the starter after the continuing of the start-up process of the engine by use of the motor-generator, determining whether the engine RPM exceeds a predetermined third reference RPM determined in advance to be higher than the second reference RPM, and stopping the start-up process of the engine using the motor-generator when the engine RPM exceeds the third reference RPM.

According to an exemplary embodiment of the present invention, the stopping of the start-up process of the engine using the motor-generator may be performed by driving the motor-generator by use of the engine such that electricity is produced in the motor-generator.

According to an exemplary embodiment of the present invention, the second reference RPM may be 80 RPM, and the third reference RPM may be 200 RPM.

According to an exemplary embodiment of the present invention, the method may further include starting the engine by use of the motor-generator in a predetermined restart mode, when the cooperative control start condition is not satisfied.

According to an exemplary embodiment of the present invention, the starting of the engine by use of the motor-generator may include beginning a start-up process of the engine by use of the motor-generator, determining whether the engine RPM exceeds a predetermined fourth reference RPM, and stopping the start-up process of the engine using the motor-generator when the engine RPM exceeds the fourth reference RPM.

According to an exemplary embodiment of the present invention, the stopping of the start-up process of the engine using the motor-generator may include driving the motor-generator by use of the engine such that electricity is produced in the motor-generator.

According to an exemplary embodiment of the present invention, the fourth reference RPM may be 200 RPM.

The method for starting an engine for a hybrid electric vehicle, according to an exemplary embodiment of the present invention, has the following effects:

First, the present invention may minimize the number of times and the amount of time that a starter is used, effectively ensuring durability of the starter, and may assist with more stable implementation of an ISG mode, further enhancing fuel efficiency of the vehicle.

Second, the present invention may minimize the number of times that a motor-generator is used in a high-torque section, solving a problem that a driving force of the motor-generator is not effectively transmitted to the engine due to slipping of a belt, or preventing damage to the belt.

Third, the present invention may start the engine by use of the motor-generator when the engine performs an inertial rotary motion, more effectively ensuring durability of the starter, and may assist with more stable implementation of an ISG mode, enhancing fuel efficiency of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
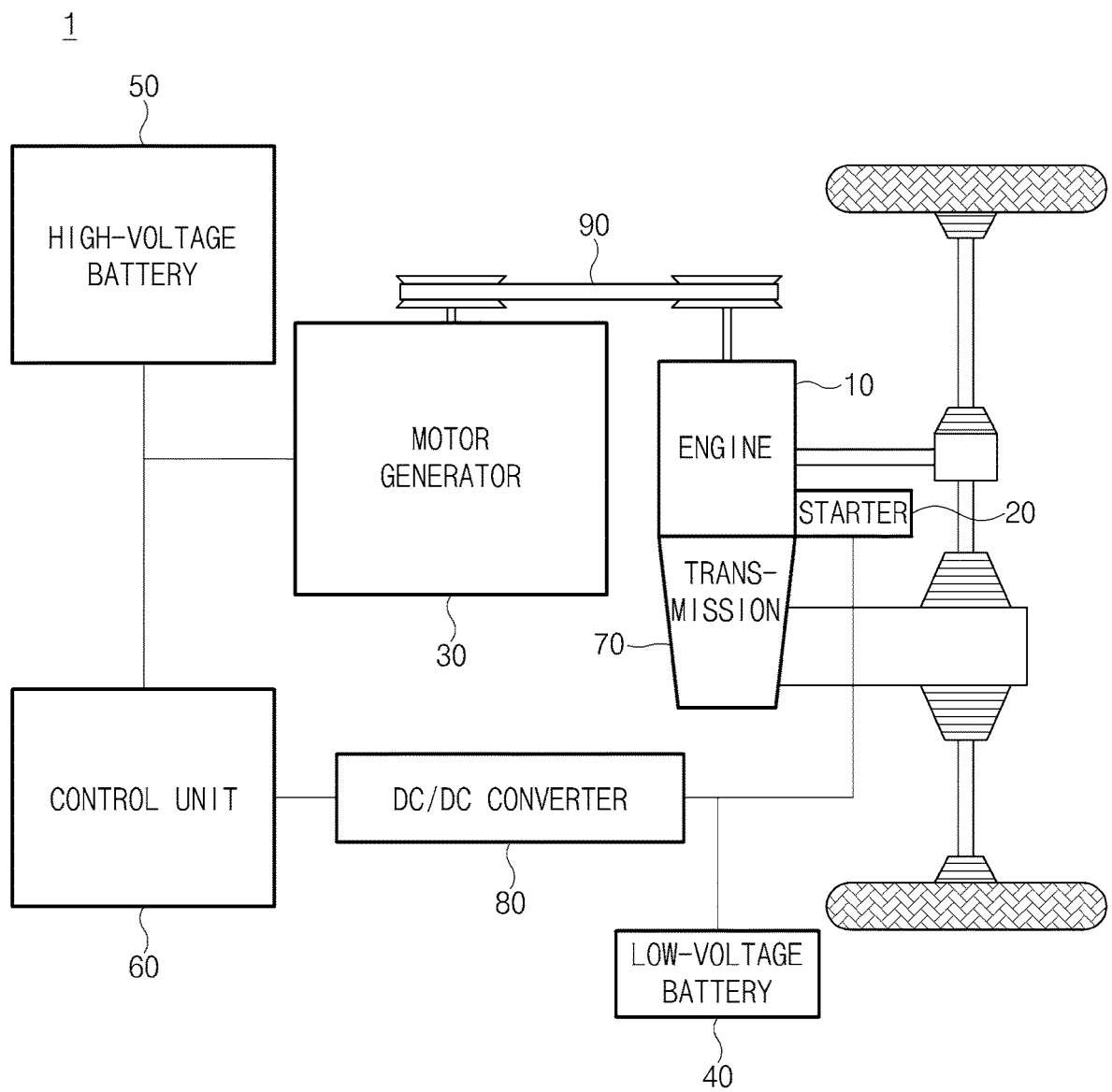
FIG. 1 is a schematic view illustrating a configuration of a hybrid electric vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present invention.

Terms, such as "first", "second", "A", "B", "(a)", "(b)", and the like, may be used herein to describe elements of the present invention. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
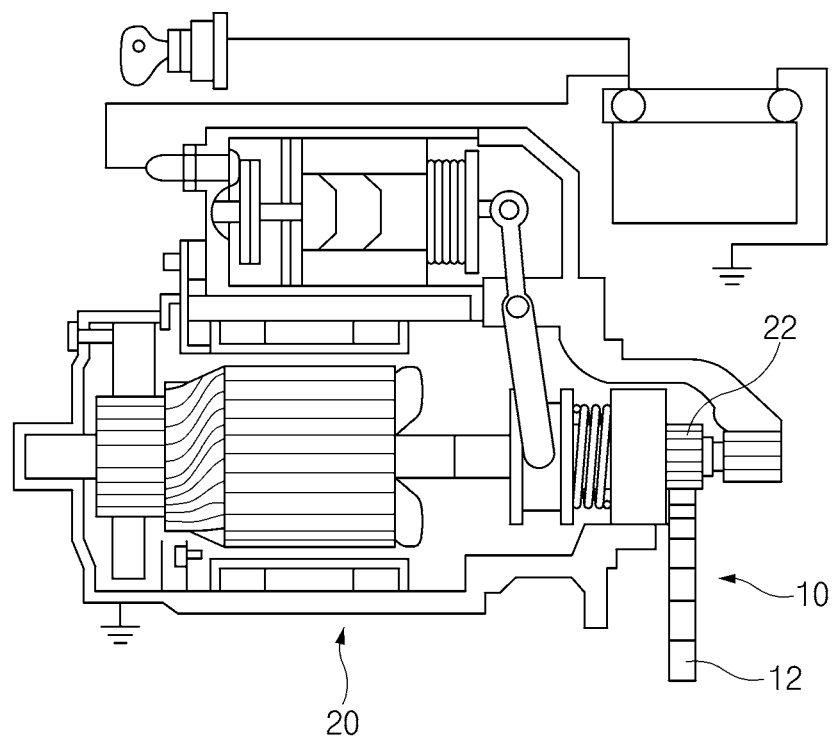
FIG. 2 illustrates a state in which an engine and a starter illustrated in FIG. 1 are connected to each other.
Figure 3:
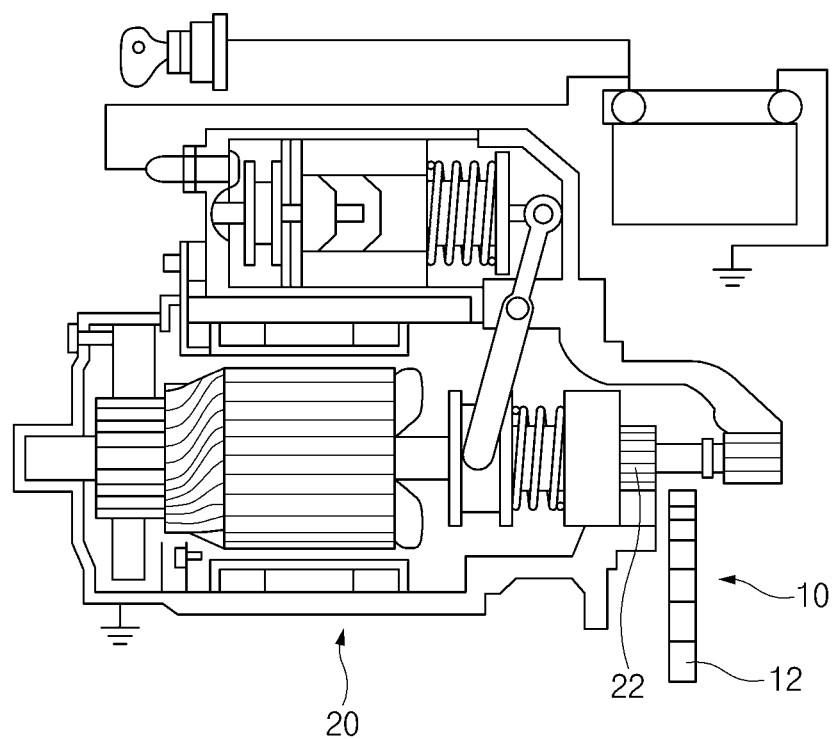
FIG. 3 illustrates a state in which the engine and the starter illustrated in FIG. 1 are disconnected from each other.

FIG. 1 is a schematic view illustrating a configuration of a hybrid electric vehicle according to an exemplary embodiment of the present invention. FIG. 2 illustrates a state in which an engine and a starter illustrated in FIG. 1 are connected to each other. FIG. 3 illustrates a state in which the engine and the starter illustrated in FIG. 1 are disconnected from each other.

A method for starting an engine for a hybrid electric vehicle 1 (hereinafter, referred to as the "engine starting method") according to an exemplary embodiment of the present invention is concerned with a method for starting the engine for the hybrid electric vehicle 1 that may include a starter 20 and a motor-generator 30. For the convenience of description, a schematic configuration of the hybrid electric vehicle 1 will hereinafter be described prior to the engine starting method.

As illustrated in FIG. 1, the hybrid electric vehicle 1 may include: an engine 10; the starter 20 connected to the engine 10 by a gear and configured to start the engine 10; the motor-generator 30 connected to the engine 10 by a belt 90 and configured to start the engine 10 or produce electricity; a low-voltage battery 40 configured to supply low-voltage power for driving the starter 20; a high-voltage battery 50 configured to supply high-voltage power for driving the motor-generator 30; and a control device 60 configured to control the hybrid electric vehicle 1.

The engine 10 may be connected to a transmission 70 to transmit power to vehicle wheels through the transmission 70, as illustrated in FIG. 1.

As illustrated in FIG. 2, the starter 20 may be connected to the engine 10 through a pinion gear 22 of the starter 20 and a ring gear 12 of the engine 10 that are engaged with each other, and may be driven by low-voltage power supplied from the low-voltage battery 40 to start the engine 10. As illustrated in FIG. 3, when the starter 20 is not used, the pinion gear 22 of the starter 20 and the ring gear 12 of the engine 10 may be disengaged from each other, and thus the starter 20 may be disconnected from the engine 10.

As illustrated in FIG. 1, the motor-generator 30 may be connected to a crank pulley of the engine 10 by the belt 90. In the case of starting the engine 10, the motor-generator 30 may be driven, as a starter, by high-voltage power supplied from the high-voltage battery 50 to start the engine 10. In the case where there is excess torque in the output power of the engine 10 or in the case where regenerative braking is performed, the motor-generator 30 may be driven, as a generator, by the engine 10 to produce electricity.

The low-voltage battery 40 and the high-voltage battery 50 may be electrically connected to each other by a DC/DC converter 80, as illustrated in FIG. 1. The DC/DC converter 80 may convert low-voltage power supplied from the low-voltage battery 40 into high-voltage power to transmit the high-voltage power to the high-voltage battery 50, or may convert high-voltage power supplied from the high-voltage battery 50 into low-voltage power to transmit the low-voltage power to the low-voltage battery 40. The low-voltage battery 40 and the high-voltage battery 50 may preferably be a 24-volt battery and a 48-volt battery, respectively, but are not limited thereto.

The control device 60 may include: a hybrid control unit (HCU) that controls the overall operation of the hybrid electric vehicle 1; an engine control unit (ECU) that controls starting of the engine 10 and output power thereof in response to a control signal of the HCU; a motor control unit (MCU) that controls drive torque and speed of the starter 20 and the motor-generator 30 in response to a control signal of the HCU and controls the motor-generator 30 to output optimum generator voltage when the motor-generator 30 operates as a generator; and a battery management system (BMS) that controls driving of the low-voltage battery 40 and the high-voltage battery 50 in response to a control signal of the HCU.

Figure 4:
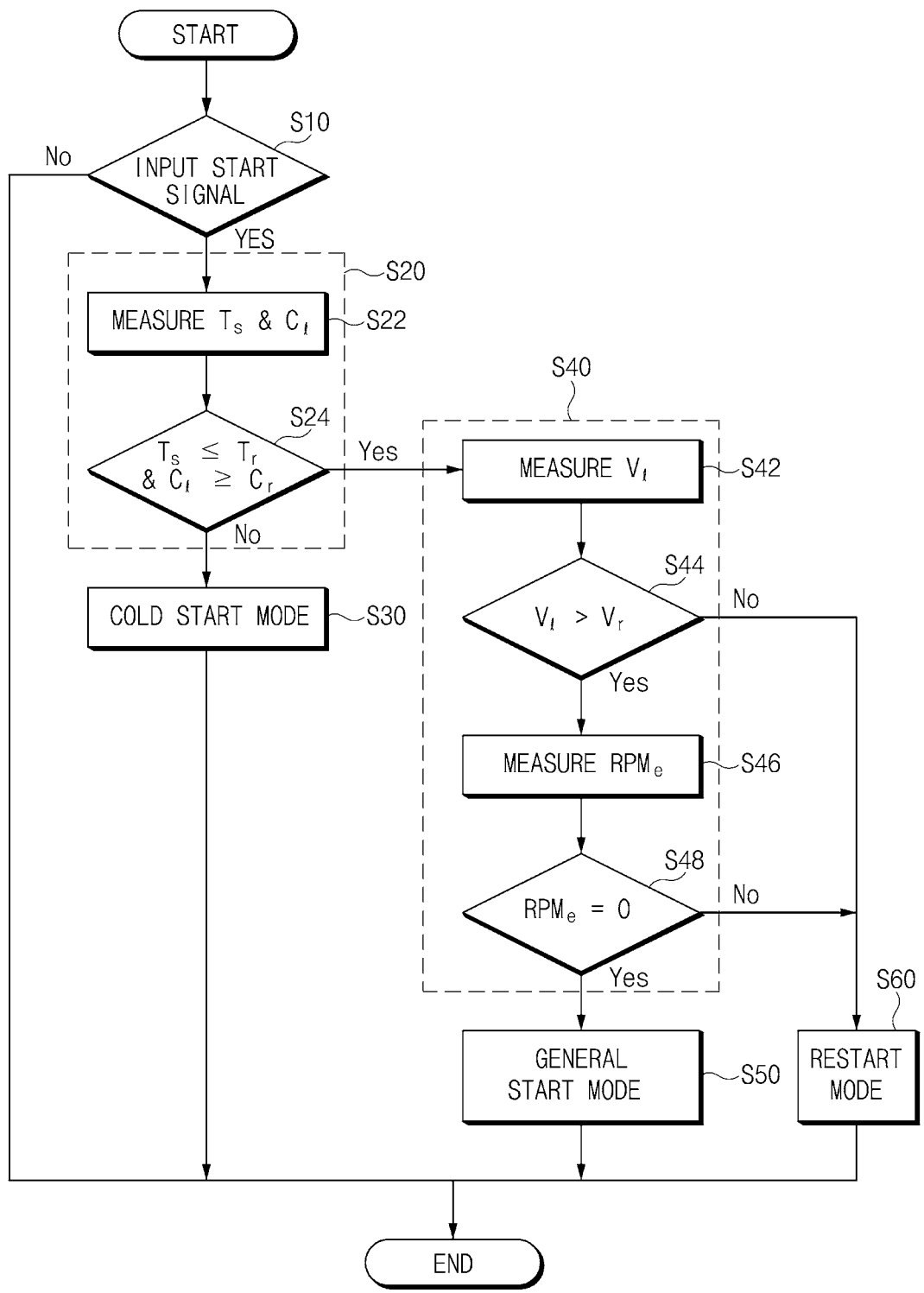
FIG. 4 is a flowchart illustrating a method for starting an engine for a hybrid electric vehicle according to an exemplary embodiment of the present invention.

FIG. 4 is a flowchart illustrating a method for starting an engine for a hybrid electric vehicle according to an exemplary embodiment of the present invention.

Referring to FIG. 4, the engine starting method may include the steps of: determining whether a start signal is input (step S10); determining whether a predetermined cold start condition is satisfied, when it is determined that the start signal is input (step S20); starting the engine 10 by use of the starter 20 in a predetermined cold start mode when the cold start condition is satisfied (step S30); determining whether a cooperative control start condition is satisfied, when the cold start condition is not satisfied (step S40); starting the engine 10 by use of the starter 20 and the motor-generator 30 in a predetermined cooperative control start mode when the cooperative control start condition is satisfied (step S50); and starting the engine 10 by use of the motor-generator 30 in a predetermined restart mode when the cooperative control start condition is not satisfied (step S60).

First, in step S10, the control device 60 may determine whether a predetermined start signal is input.

The start signal is not limited, and various types of signals may be input to the control device 60 as a start signal depending on a driving state of the hybrid electric vehicle 1. For example, in the case where the hybrid electric vehicle 1 has completely stopped by a key-off signal, a key-on signal may be input to the control device 60 as a start signal. For example, in the case where the hybrid electric vehicle 1 enters an idle stop and go (ISG) mode and thus the engine 10 idle-stops, an accelerator-pedal-on signal may be input to the control device 60 as a start signal. Here, the ISG mode refers to a function of idle-stopping the engine 10 to reduce fuel consumption when the hybrid electric vehicle 1 stops to wait at traffic lights or comes to a stop in traffic jams.

Next, when the determination result in step S10 shows that the start signal is input, the control device 60 may, in step S20, determine whether a cold start condition is satisfied.

When it is appropriate to start the engine 10 by use of the starter 20 having a higher initial torque value than the motor-generator 30, the control device 60 may preferably determine that the cold start condition is satisfied. For example, when engine stall time $T_s$ exceeds predetermined reference stall time $T_r$, and/or when a current $C_l$ of the low-voltage battery (40) is lower than a predetermined reference current $C_r$, the control device 60 may determine that the cold start condition is satisfied. The engine stall time $T_s$ refers to a time period during which the engine 10 has stopped until the start signal is input.

In the case where the engine stall time $T_s$ is long, a lubrication system of the hybrid electric vehicle 1 is less likely to operate as designed. Due to the provided configuration, when the engine 10 starts using the motor-generator 30 having a low initial torque value in the case where the engine stall time $T_s$ is long, the belt 90 may slip and thus may not effectively transmit a driving force of the motor-generator 30 to the engine 10, or the belt 90 may be damaged. Accordingly, in the case where the engine stall time $T_s$ is long, it is preferable to start the engine 10 by use of the starter 20 having a high initial torque value.

Furthermore, in the case where the current $C_l$ of the low-voltage battery 40 is lower than the reference current $C_r$, it is preferable to start the engine 10 using only the starter 20 that is driven by low-voltage power.

In regard to the cold start condition described above, step S20 may include the steps of: measuring the engine stall time $T_s$ and the current $C_l$ of the low-voltage battery 40 (step S22); and determining whether the engine stall time $T_s$ measured in step S22 is less than or equal to the reference stall time $T_r$ and whether the battery current $C_l$ measured in step S22 is higher than or equal to the reference current $C_r$ (step S24).

In step S22, the control device 60 may compare the time period between the engine stop signal and the engine start signal in step S10 with the reference stall time $T_r$, and may compare the current $C_l$ of the low-voltage battery 40, which has been measured by a current sensor, with the reference current $C_r$.

As illustrated in FIG. 4, the control device 60 may perform step S40, which will be described below, when the determination result in step S24 shows that the engine stall time $T_s$ is less than or equal to the reference stall time $T_r$, and the battery current $C_i$ is higher than or equal to the reference current $C_r$, and the control device 60 may perform step S30, which will be described below, if not.

Figure 5:
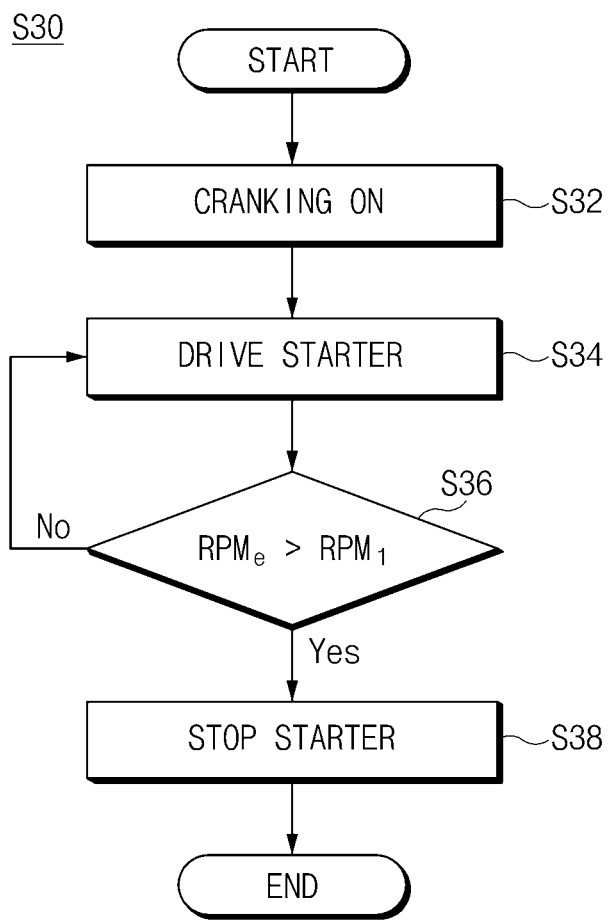
FIG. 5 is a flowchart for explaining a cold start mode illustrated in FIG. 4.

FIG. 5 is a flowchart for explaining the cold start mode illustrated in FIG. 4.

In step S30, the control device 60 may start the engine 10 by use of the starter 20 in a predetermined cold start mode when the determination result in step S20 shows that the cold start condition is satisfied.

A method for implementing the cold start mode using the starter 20 is not limited. For example, step S30 may include the steps of: performing cranking-on (step S32); beginning a start-up process of the engine 10 by use of the starter 20 (step S34); determining whether an engine RPM ($RPM_e$) exceeds a predetermined first reference RPM ($RPM_1$) (step S36); and stopping the start-up process of the engine using the starter 20 when the engine RPM ($RPM_e$) exceeds the first reference RPM ($RPM_1$) (step S38).

In step S32, the control device 60 may input signals to the engine 10 to perform processes (such as, fuel injection, ignition, and the like) that are necessary for starting the engine 10.

In step S34, the control device 60 may drive the starter 20 by use of low-voltage power supplied from the low-voltage battery 40 after the pinion gear 22 of the starter 20 is engaged with the ring gear 12 of the engine 10 to connect the starter 20 and the engine 10. As such, the start-up process of the engine 10 may be started by the starter 20, and the engine RPM ($RPM_e$) may gradually increase.

In step S36, the control device 60 may compare the engine RPM ($RPM_e$) measured by an RPM sensor and the first reference RPM ($RPM_1$). The first reference RPM ($RPM_1$) is not limited, and an RPM ($RPM_e$) at which the engine 10 is independently driven with no assist from the starter 20 may be determined to the first reference RPM ($RPM_1$). For example, the first reference RPM ($RPM_1$) may be 200 RPM.

In step S38, the starter 20 and the engine 10 may be disconnected from each other by disengaging the pinion gear 22 of the starter 20 and the ring gear 12 of the engine 10. Thereafter, the engine 10 may be independently driven with no assist from the starter 20.

Next, when the determination result in step S20 shows that the cold start condition is not satisfied, the control device 60 may, in step S40, determine whether a cooperative control start condition is satisfied.

The control device 60 may determine that the cooperative control start condition is satisfied, when it is possible to continue an start-up process of the engine by use of the motor-generator 30, instead of the starter 20, in a last stage of the start-up process of the engine to reduce the amount of time that the starter 20 is used, although it is preferable to begin the start-up process of the engine 10 by use of the starter 20 in an initial stage of the engine start-up process. For example, when a voltage $V_l$ of the low-voltage battery 40 exceeds a predetermined reference voltage $V_r$ and an engine RPM ($RPM_e$) is equal to zero, the control device 60 may determine that the cooperative control start condition is satisfied.

In regard to the cooperative control start condition described above, step S40 may include the steps of: measuring the voltage $V_l$ of the low-voltage battery 40 (step S42); determining whether the voltage $V_l$ of the low-voltage battery 40, which has been measured in step S42, exceeds the reference voltage $V_r$ (step S44); measuring an engine RPM ($RPM_e$) when the determination result in step S44 shows that the voltage $V_l$ of the low-voltage battery 40 exceeds the reference voltage $V_r$ (step S46); and determining whether the engine RPM ($RPM_e$) measured in step S46 is equal to zero (step S48).

In step S44, the control device 60 may compare the voltage $V_l$ of the low-voltage battery 40, which has been measured by a voltage sensor, with the reference voltage $V_r$.

In step S48, the control device 60 may determine whether the engine RPM ($RPM_e$) measured by an RPM sensor is equal to zero.

When the determination result in step S44 shows that the voltage $V_l$ of the low-voltage battery 40 exceeds the reference voltage $V_r$ and the determination result in step S48 shows that the engine RPM ($RPM_e$) is equal to zero, the control device 60 may determine that the cooperative control start condition is satisfied and may then perform step S50, which will be described below. When the determination result in step S44 shows that the voltage $V_l$ of the low-voltage battery 40 is lower than or equal to the reference voltage $V_r$, or when the determination result in step S48 shows that the engine RPM ($RPM_e$) is not equal to zero, the control device 60 may determine that the cooperative control start condition is not satisfied and may then perform step S60, which will be described below.

Figure 6:
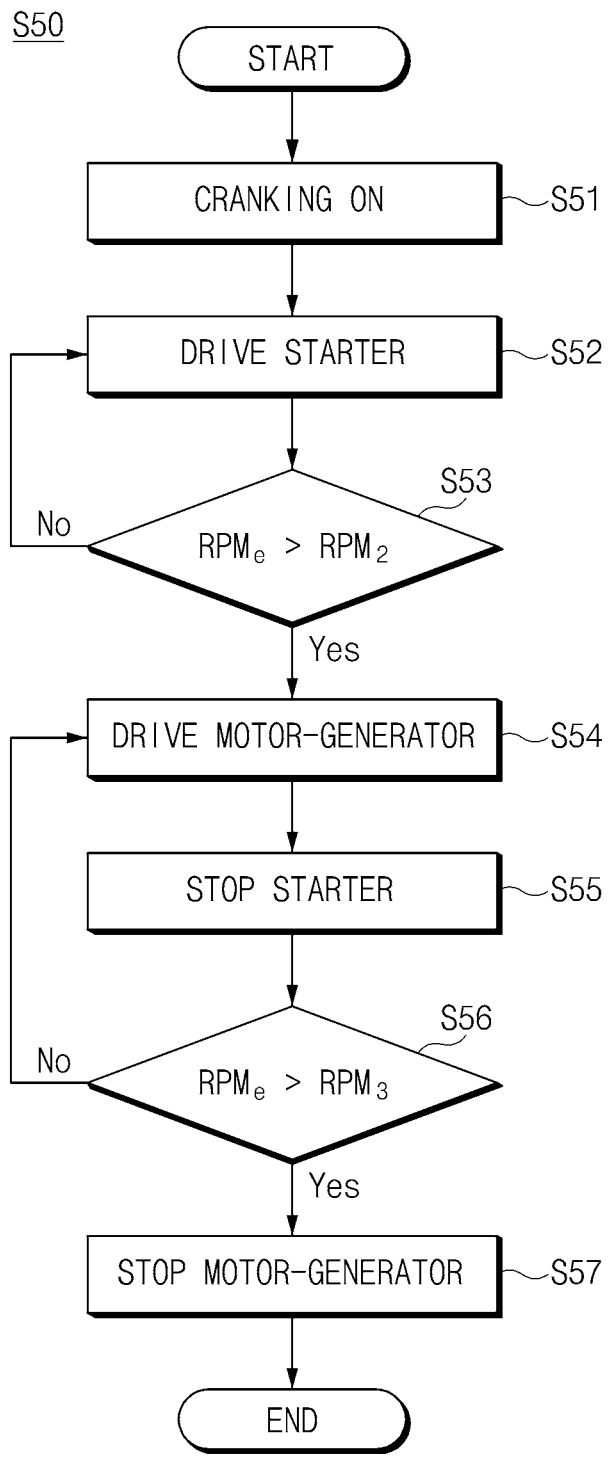
FIG. 6 is a flowchart for explaining a general start mode illustrated in FIG. 4.
Figure 7:
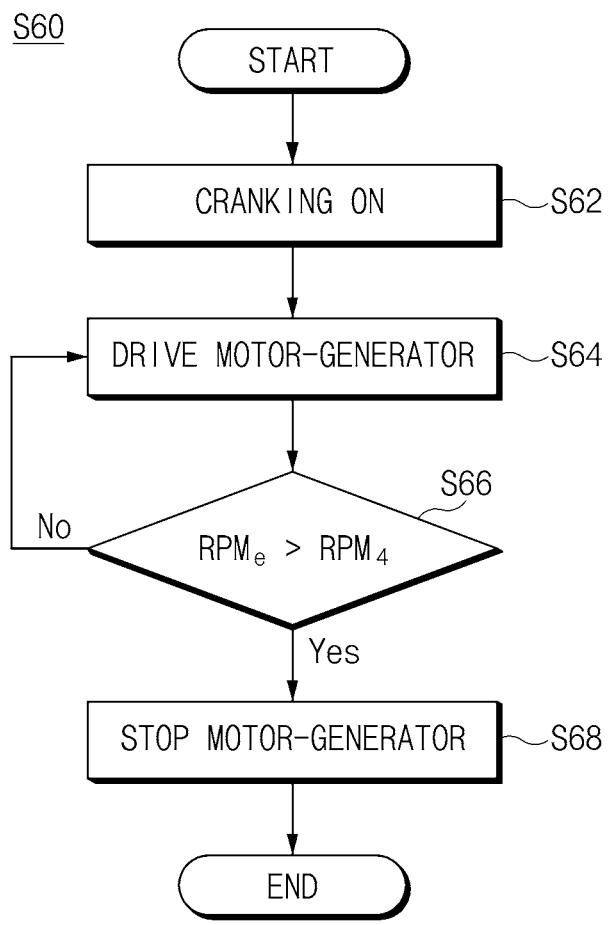
FIG. 7 is a flowchart for explaining a restart mode illustrated in FIG. 4.

FIG. 6 is a flowchart for explaining the general start mode illustrated in FIG. 4.

Next, when the determination result in step S40 shows that the cooperative control start condition is satisfied, the control device 60 may, in step S50, start the engine 10 in a predetermined cooperative control start mode. The cooperative control start mode means starting the engine by sequentially driving the starter 20 and the motor generator 30 in a predetermined order.

A method for implementing the cooperative control start mode is not limited. For example, step S50 may include the steps of: performing cranking-on (step S51); beginning a start-up process of the engine 10 by use of the starter 20 (step S52); determining whether an engine RPM ($RPM_e$) exceeds a predetermined second reference RPM ($RPM_2$) (step S53); continuing the start-up process of the engine by use of the motor-generator 30 when the engine RPM ($RPM_e$) exceeds the second reference RPM ($RPM_2$) (step S54); stopping the start-up process of the engine using the starter 20 (step S55); determining whether the engine RPM ($RPM_e$) exceeds a predetermined third reference RPM ($RPM_3$) determined in advance to be higher than second reference RPM ($RPM_2$) (step S56); and stopping the start-up process of the engine using the motor-generator 30 when the engine RPM ($RPM_e$) exceeds the third reference RPM ($RPM_3$) (step S57).

In step S51, the control device 60 may input signals to the engine 10 to perform processes (such as, fuel injection, ignition, and the like) that are necessary for starting the engine 10.

In step S52, the control device 60 may drive the starter 20 by use of low-voltage power supplied from the low-voltage battery 40 after the pinion gear 22 of the starter 20 is engaged with the ring gear 12 of the engine 10 to connect the starter 20 and the engine 10. As such, the start-up process of the engine 10 may be started by a driving force transmitted from the starter 20, and the engine RPM ($RPM_e$) may gradually increase.

In step S53, the control device 60 may compare the engine RPM ($RPM_e$) measured by an RPM sensor and the second reference RPM ($RPM_2$). The second reference RPM ($RPM_2$) is not limited, and an RPM ($RPM_e$) at which the belt 90 is much less likely to slip even when the control device 60 continues the start-up process of the engine by use of the motor-generator 30, instead of the starter 20, may be set to the second reference RPM ($RPM_2$). For example, the second reference RPM ($RPM_2$) may be 80 RPM.

In step S54, the control device 60 may drive the motor-generator 30 as a starter by use of high-voltage power supplied from the high-voltage battery 50. The start-up process of the engine 10 may be continued by a driving force transmitted from the motor-generator 30 through the belt 90, and therefore the engine RPM ($RPM_e$) may gradually increase.

In step S55, the starter 20 and the engine 10 may be disconnected from each other by disengaging the pinion gear 22 of the starter 20 and the ring gear 12 of the engine 10. As such, the start-up process of the engine 10 may be continued by only assist from the motor-generator 30 other than the starter 20. Step S55 may be simultaneously performed together with step S54.

In step S56, the control device 60 may compare the engine RPM ($RPM_e$) measured by an RPM sensor and the third reference RPM ($RPM_3$). The third reference RPM ($RPM_3$) is not limited, and an RPM at which the engine 10 is independently driven with no assist from the motor-generator 30 may be set to the third reference RPM ($RPM_3$). For example, the third reference RPM ($RPM_3$) may be 200 RPM.

In step S57, the control device 60 may interrupt the high-voltage power supplied to the motor-generator 30 to prevent the motor-generator 30 from being driven as a starter. As such, the engine 10 may be independently driven with no assist from the motor-generator 30. Furthermore, in step S57, the control device 60 may also drive the motor-generator 30 by use of a driving force of the engine 10 to allow the motor-generator 30 to be driven as a generator. As such, the motor-generator 30 may produce electricity, and the high-voltage battery 50 may be charged with the produced electricity.

Next, in step S60, the control device 60 may start the engine 10 by use of the motor-generator 30 in a predetermined restart mode when the determination result in step S40 shows that the cooperative control start condition is not satisfied.

In the case where the voltage $V_l$ of the low-voltage battery 40 is lower than the reference voltage $V_r$, it may be hard to stably supply low-voltage power of the low-voltage battery 40 to the starter 20. Furthermore, the pinion gear 22 of the starter 20 and the ring gear 12 of the engine 10 may be damaged when the engine 10 starts through the starter 20 in the case where the engine RPM ($RPM_e$) is not equal to zero due to inertial rotation of the engine 10. Here, the inertial rotation of the engine 10 refers to a phenomenon in which the engine 10 rotates for a time period by inertial force acting on the engine 10 when the engine 10 stops by interrupting supply of fuel to the engine 10. Considering the effects caused by the voltage level of the low-voltage battery 40 or the inertial rotation of the engine 10, the control device 60 may perform the restart mode to start the engine 10 by use of only the motor-generator 30 in the case where the cooperative control start condition is not satisfied.

A method for implementing the restart mode by use of the motor-generator 30 is not limited. For example, step S60 may include the steps of: performing cranking-on (step S62); beginning a start-up process of the engine 10 by use of the motor-generator 30 (step S64); determining whether an engine RPM ($RPM_e$) exceeds a predetermined fourth reference RPM ($RPM_4$) (step S66); and stopping the start-up process of the engine using the motor-generator 30 when the engine RPM ($RPM_e$) exceeds the fourth reference RPM ($RPM_4$) (step S68).

In step S62, the control device 60 may input signals to the engine 10 to perform processes (such as, fuel injection, ignition, and the like) that are necessary for starting the engine 10.

In step S64, the control device 60 may drive the motor-generator 30 as a starter by use of high-voltage power supplied from the high-voltage battery 50. The start-up process of the engine 10 may be started by a driving force transmitted from the motor-generator 30 through the belt 90, and therefore the engine RPM ($RPM_e$) may gradually increase.

In step S66, the control device 60 may compare the engine RPM ($RPM_e$) measured by an RPM sensor and the fourth reference RPM ($RPM_4$). The fourth reference RPM ($RPM_4$) is not limited, and an RPM at which the engine 10 is independently driven with no assist from the motor-generator 30 may be set to the fourth reference RPM ($RPM_4$). For example, the fourth reference RPM ($RPM_4$) may be 200 RPM.

In step S68, the control device 60 may interrupt the high-voltage power supplied to the motor-generator 30 to prevent the motor-generator 30 from being driven as a starter. As such, the engine 10 may be independently driven with no assist from the motor-generator 30. Furthermore, in step S68, the control device 60 may also drive the motor-generator 30 by use of a driving force of the engine 10 to allow the motor-generator 30 to be driven as a generator. As such, the motor-generator 30 may produce electricity, and the high-voltage battery 50 may be charged with the produced electricity.

In general, a vehicle having an idle-stop and go (ISG) mode implemented therein may have a reduction in durability of the starter 20 due to frequent start-up of the engine 10, compared to a vehicle in which an ISG mode is not implemented. However, according to the engine starting method, it is possible to minimize the number of times and the amount of time that the starter 20 is used, by starting the engine 10 by restrictively using only the starter 20 when performing the cold start mode. Accordingly, the engine starting method may effectively ensure durability of the starter 20 and may enhance fuel efficiency of the vehicle by assisting with stable implementation of an ISG mode.

Furthermore, the starter 20 connected to the engine 10 by the gears has a higher initial torque value than the motor-generator 30 connected to the engine 10 by the belt 90. However, according to the engine starting method, when the general start mode is performed, it is possible to begin a start-up process of the engine 10 by use of the starter 20 in the initial stage of the start-up process of the engine in which high torque is required and to complete the start-up process of the engine 10 by use of the motor-generator 30 in the last stage of the start-up process of the engine in which low torque is required. Accordingly, the engine starting method may reduce the number of times that the motor-generator 30 is used in a high-torque section, solving a problem that a driving force of the motor-generator 30 is not effectively transmitted to the engine 10 due to slipping of the belt 90, and preventing damage to the belt 90.

In general, an initial torque value required to start the engine 10 is lower when the engine 10 performs an inertial rotary motion than when the engine 10 has completely stopped. Accordingly, it is possible to effectively transmit power of the motor-generator 30 to the engine 10 even when starting the engine 10 by use of only the motor-generator 30 having a low initial torque value. When the engine 10 in an inertial rotary motion starts through the starter 20, the pinion gear 22 of the starter 20 and the ring gear 12 of the engine 10 may be damaged due to a collision therebetween. Since the engine of the hybrid electric vehicle 1 having an ISG mode implemented therein more frequently stops than the engine of a vehicle having no ISG mode, problems caused by inertial rotation of the engine 10 may occur frequently. Considering these problems, the engine starting method may start the engine 10 by use of only the motor-generator 30 when performing the restart mode. As a result, the engine starting method may further reduce the number of times and the amount of time that the starter 20 is used, and may prevent damage to the pinion gear 22 of the starter 20 and the ring gear 12 of the engine 10. Therefore, the engine starting method may more effectively ensure durability of the starter 20 and may further enhance fuel efficiency of the vehicle by assisting with more stable implementation of an ISG mode.

Although the present invention has been described with reference to exemplary embodiments and the accompanying drawings, the present invention is not limited thereto, but may be variously modified and altered by those skilled in the art to which the present invention pertains without departing from the spirit and scope of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for starting an engine for a hybrid electric vehicle that includes a starter connected to the engine by a gear to start the engine and a motor-generator connected to the engine by a belt to start the engine or produce electricity, the method comprising:
    determining, by a controller, whether a start signal is input;
    determining, by the controller, whether a predetermined cold start condition is satisfied, when the controller determines that the start signal is input;
    starting the engine by use of the starter in a predetermined cold start mode when the cold start condition is satisfied;
    determining, by the controller, whether a predetermined cooperative control start condition is satisfied, when the cold start condition is not satisfied; and
    starting the engine by use of the starter and the motor-generator in a predetermined cooperative control start mode, when the cooperative control start condition is satisfied, wherein the cold start condition is satisfied when an engine stall time exceeds a predetermined reference stall time.

2. The method of claim 1, wherein the determining of whether the predetermined cold start condition is satisfied includes:
    determining whether the engine stall time is less than or equal to the predetermined reference stall time; and
    determining whether a current of a battery is higher than or equal to a predetermined reference current.

3. The method of claim 1, wherein the starting of the engine by use of the starter includes:
    beginning a start-up process of the engine by use of the starter;
    determining whether an engine revolution per minute (RPM) exceeds a predetermined first reference RPM; and
    stopping the start-up process of the engine using the starter when the engine RPM exceeds the predetermined first reference RPM.

4. The method of claim 3, wherein the beginning of the start-up process of the engine is performed by engaging a pinion gear of the starter and a ring gear of the engine together; and
    wherein the stopping of the start-up process of the engine is performed by disengaging the pinion gear of the starter and the ring gear of the engine.

5. The method of claim 3, wherein the predetermined first reference RPM is 200 RPM.

6. The method of claim 1, wherein the predetermined cooperative control start condition is satisfied when a voltage of a battery configured to supply power to the starter exceeds a predetermined reference voltage and an engine RPM is equal to zero.

7. The method of claim 6, wherein the determining of whether the predetermined cooperative control start condition is satisfied includes:
    determining whether the voltage of the battery exceeds the predetermined reference voltage; and
    determining whether the engine RPM is equal to zero.

8. The method of claim 6, wherein the starting of the engine by use of the starter and the motor-generator includes:
    beginning a start-up process of the engine by use of the starter;
    determining whether the engine RPM exceeds a predetermined second reference RPM; and
    continuing the start-up process of the engine by use of the motor-generator when the engine RPM exceeds the predetermined second reference RPM.

9. The method of claim 8, wherein the starting of the engine by use of the starter and the motor-generator further includes:
    stopping the start-up process of the engine using the starter after the continuing of the start-up process of the engine by use of the motor-generator;
    determining whether the engine RPM exceeds a predetermined third reference RPM determined in advance to be higher than the predetermined second reference RPM; and
    stopping the start-up process of the engine using the motor-generator when the engine RPM exceeds the predetermined third reference RPM.

10. The method of claim 9, wherein the stopping of the start-up process of the engine using the motor-generator is performed by driving the motor-generator by use of the engine such that electricity is produced in the motor-generator.

11. The method of claim 9, wherein the predetermined second reference RPM is 80 RPM, and wherein the predetermined third reference RPM is 200 RPM.

12. The method of claim 6, further including:
starting the engine by use of the motor-generator in a predetermined restart mode, when the predetermined cooperative control start condition is not satisfied.

13. The method of claim 12, wherein the starting of the engine by use of the motor-generator includes:
beginning a start-up process of the engine by use of the motor-generator;
determining whether the engine RPM exceeds a predetermined fourth reference RPM; and
stopping the start-up process of the engine using the motor-generator when the engine RPM exceeds the predetermined fourth reference RPM.

14. The method of claim 13, wherein the stopping of the start-up process of the engine using the motor-generator is performed by driving the motor-generator by use of the engine such that electricity is produced in the motor-generator.

15. The method of claim 13, wherein the predetermined fourth reference RPM is 200 RPM.

* * * * *